United States Patent
Simmons et al.

(10) Patent No.: US 7,974,873 B2
(45) Date of Patent: Jul. 5, 2011

(54) JUST IN TIME PICKUP OR RECEIPT OF GOODS OR SERVICES BY A MOBILE USER

(75) Inventors: Joel Dennis Simmons, Camarillo, CA (US); David Serge Nissim Pewzner, Camarillo, CA (US)

(73) Assignee: Now On Wireless, LLC, Simi Valley, CA (US)

( * ) Notice: Subject to any disclaimer, the term of this patent is extended or adjusted under 35 U.S.C. 154(b) by 631 days.

(21) Appl. No.: 12/043,719

(22) Filed: Mar. 6, 2008

(65) Prior Publication Data

US 2009/0228325 A1 Sep. 10, 2009

(51) Int. Cl.
*G06F 17/30* (2006.01)
(52) U.S. Cl. .................. 705/10; 705/1; 705/14; 705/28; 705/26; 701/300; 709/246; 455/12.1
(58) Field of Classification Search .................... 705/10, 705/35, 26, 14, 30
See application file for complete search history.

(56) References Cited

U.S. PATENT DOCUMENTS

| 7,627,647 | B2 * | 12/2009 | Takayama et al. | 709/217 |
|---|---|---|---|---|
| 2006/0111955 | A1 * | 5/2006 | Winter et al. | 705/8 |
| 2007/0061245 | A1 * | 3/2007 | Ramer et al. | 705/37 |
| 2007/0291710 | A1 * | 12/2007 | Fadell | 370/338 |
| 2008/0040233 | A1 * | 2/2008 | Wildman et al. | 705/26 |
| 2009/0265257 | A1 * | 10/2009 | Klinger et al. | 705/27 |

* cited by examiner

*Primary Examiner* — Vanel Frenel
(74) *Attorney, Agent, or Firm* — Frommer Lawrence & Haug LLP; Jamie L. Wiegand

(57) ABSTRACT

Embodiments are directed towards dynamically determining a merchant to provide just in time (JIT) goods/services/appointments to a mobile customer by seeking to minimize the mobile customer's wait time or optimizing another parameter. A registered user may place an order with a JIT service for a good/server using a mobile device. The JIT service determines a merchant/location that may satisfy the order based on attempting to minimize the user's wait time. At any time before a locktime is reached, the JIT service, the selected merchant location, and/or the user may modify the request. For example, the JIT service may select another merchant location to satisfy the request based on dynamically updating wait times at the selected location and other possible merchant locations, as well as other parameters. The JIT service may also track behaviors of the user to suggest recurring orders, modifications to orders, or changes in merchant locations.

25 Claims, 7 Drawing Sheets

JUST IN TIME PICKUP OR RECEIPT OF GOODS OR SERVICES BY A MOBILE USER

TECHNICAL FIELD

The present invention relates generally to order management of goods or services, and more particularly but not exclusively to employing just in time pickup or delivery of at least expirable goods, services, appointments, or the like, by a mobile customer.

BACKGROUND

Without question many people today find waiting in lines can be a frustrating and aggravating waste of their time. No matter how friendly or responsive the service may be, nonetheless, many people are often left with a perception that the quality of service was unsatisfactory. This perception may even result in customers taking their business elsewhere: somewhere where they may believe they do not have to wait.

However, customers that are "on the go" may not always be able to quickly and easily determine where that business is that has a minimal or no wait service. Sometimes, merely driving around looking for that "no wait" business may actually consume more time than waiting in the line! Moreover, the outside appearance of a business as one drives by may provide little or no indication of how long a wait might there be inside. Calling ahead to a business may also provide little help, as the business may already be overstretched, with long wait lines. Thus, the customer is forced to give up, or start "calling ahead" in search for a fast service business. All of this may result in further frustrating the customers, resulting in lost customers by the business and lost revenue. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

Figure 1:
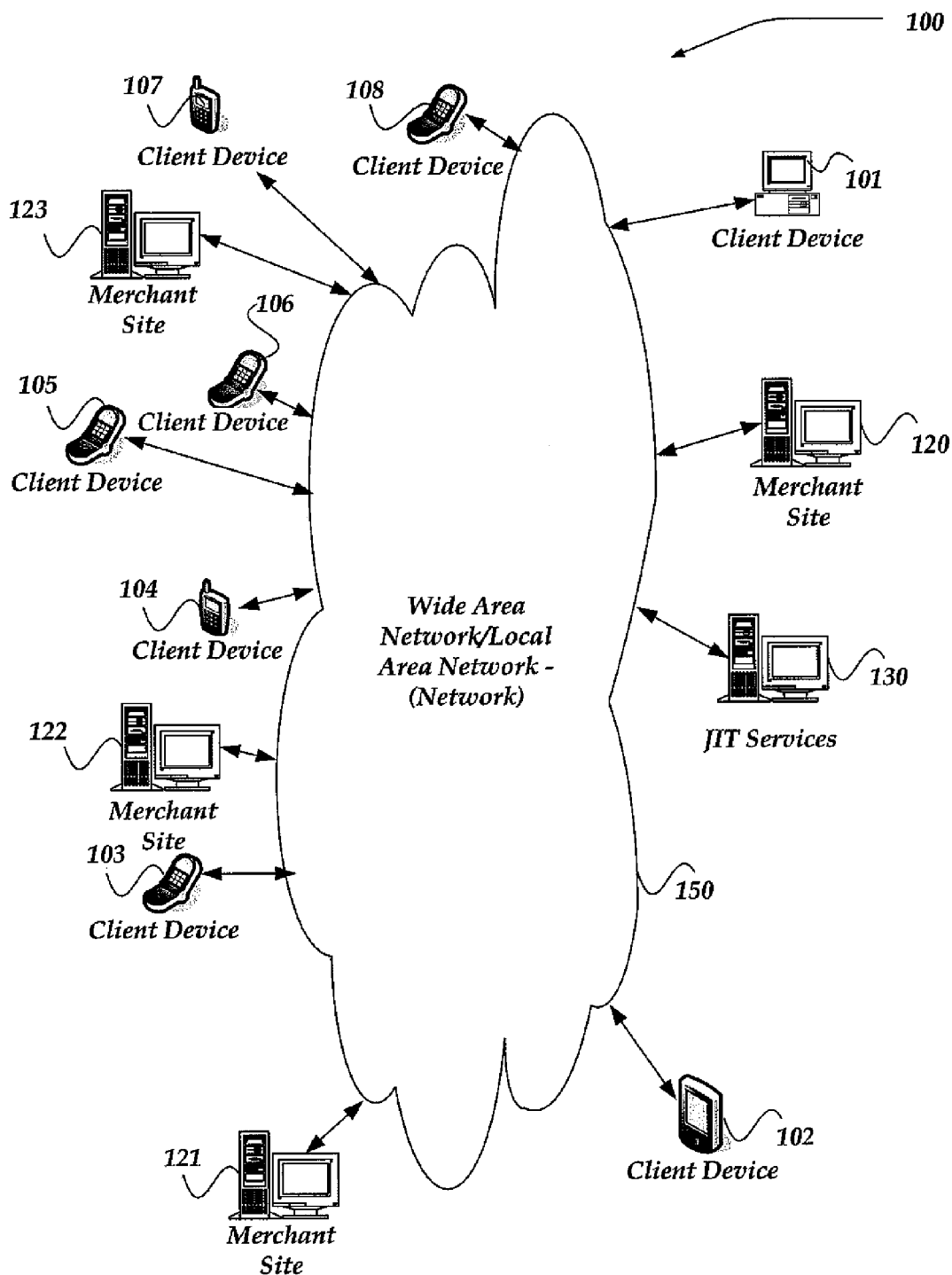
FIG. 1 shows a functional block diagram illustrating an environment for use in practicing the present invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, tough it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "order" refers to any request for a good or service, including, but not limited to new requests, modified requests, pre-requests or pre-orders, and recurring orders or requests. The term "modified order" as used herein refers to any exiting request that is revised with respect to a good or service requested, a time associated with the order (whether the time is a time of reception of the good or of the service or of a pickup/delivery of that good or service), a pickup/delivery location, or any other aspect of the existing order. Order modification also refers to changes that may be a result of a user request for the modification and/or a change that may be a result from a merchant and/or system request for the modification. For example, a merchant and/or system modification may occur due to a change to a user request based on a product/service alternate choice, a pickup/delivery alternate choice, and/or a time of service/good pickup/delivery choice. Order modification may also occur based on how busy a particular merchant location is, a product preparation time, or the like. However, order modification may further occur based on providing a coupon, discount incentive, or the like. Clearly, order modifications may arise, therefore, based on any change to an existing order placed by a customer, including cancellation of the order.

The term "locktime" refers to an amount of time prior to order fulfillment at which the order is no longer allowed to be modified. Locktime may include a variety of factors, including, but not limited to a minimum amount of time determined by a merchant to prepare the order for fulfillment.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly, various embodiments of the invention are directed towards dynamically determining a merchant/location to provide just in time goods and/or services to a mobile customer by seeking to minimize the mobile customer's wait time to pickup the ordered goods/services, or other pickup/delivery parameter. In one embodiment, the other parameter(s) may be user selectable. While, in one embodiment, the goods and/or services may be expirable, in the sense that they may include an expiration date, the invention is not so limited. Thus, in another embodiment, the goods and/or services might also include non-expirable goods/services. Non-exhaustive examples of expirable goods might include, but not be limited to food products, or other consumable goods, medicines, or the like. In one embodiment, an expirable good or service might be those goods/services (including appointments) known to be in a limited or time-constrained supply, including, but not limited to tickets to an event, hotel reservations, dinner reservations, travel reservations, appointments to and/or for any of a variety of activities, services, or the like, and/or services related to any of these.

In one embodiment, a user may initially register for the just in time (JIT) services. In one embodiment, registration might be through a web interface, or the like, such as described below. In this embodiment, the user might provide information about their preferences, billing information, information about recurring orders, and/or the like. In one embodiment, the user might provide information about how to locate and track the user. Such tracking information might be based, for example, from information obtainable from the user's mobile client device, vehicle, or the like. In another embodiment, the user might enter into a user interface, or otherwise call and identify a location, and/or predicted time or arrival to a location. The user may register using one client device and place orders using the same or even a different client device. Thus, in one embodiment, the user might register using a non-mobile client device, such as a desktop computer, or the like, and then select to use a mobile client device to place and/or modify orders. However, the invention is not constrained to this mode of interaction, and virtually any other form of interacting with the JIT service.

The user may place an order with the JIT server for a good and/or service. The user's mobile device, or other mechanism, may also provide a location of the user. The JIT service may then determine a merchant that may be able to provide the requested good and/or service to the user based on attempting to minimize a wait time for the user to pickup or otherwise receive the good/service. It is important to recognize that as noted above, while in one embodiment, the invention may be employed to minimize a wait time for the mobile user, the invention is not so limited. Thus, for example, in another embodiment, any of a variety of other parameters may be optimized, minimized, or the like. For example, a variety of user selectable parameters and/or system parameters may be optimized, including, but not limited to optimizing a mobile user's route, schedule, order time, or the like, as discussed below.

The JIT service may make such determination based, in part, on a location of the user, merchants' level of availability, busyness of the merchants, merchants' capability, merchants' locations, traffic information, as well as a variety of other parameters. The JIT service may then provide the user's request for the good/service to the selected merchant/location. The selected merchant/location determines if it can respond to the request, and provide a response to the JIT service. In one embodiment, the response may include additional information, including, but not limited to an expected wait time. If the JIT service confirms that the response meets minimal criteria, including a minimal wait time for the user, the JIT service may notify the user that the order is confirmed. The JIT service may further track the user as well as other merchants to continually monitor for minimal wait time for the user. If at any time before a minimum time (e.g., the locktime), the JIT service determines that a different merchant location might provide a wait time that is significantly less than the wait time of the current merchant location, the JIT service might automatically shift the user's request to another location, and notify the user (and the merchants) of the shift. In another embodiment, the JIT service might provide the user with a recommendation to change the merchant location, and enable the user to confirm the change, reject the change, or even modify the suggested change. Moreover, the user may be allowed to modify the order at any time before the minimum time, including cancelling the order. Once the minimum time is reached, the order can no longer be modified by the JIT service, merchant, or user.

In one embodiment, from time or order placement up to an including pickup of the order, the user may be able to monitor the status of the order. Moreover, in one embodiment, the JIT service may track information about a user, including, but not limited to pickup behaviors, order patterns, and the like. Based, in part, on the tracked information, the JIT service might determine recurring patterns about the user that may be used to adjust times for order pickups, suggest variations of goods/services that the user might also want to include in their pending order, or the like. Thus, unlike traditional order mechanisms, the present invention provides dynamic determinations of locations to satisfy an order based on changes in a mobile user's location, busyness of merchants, capability of merchants to satisfy the order, and the like. Such dynamic determination is directed towards providing minimal wait times for the user by dynamically changing orders to different merchant locations, or making other modifications to the order, before the locktime is reached.

In one embodiment, merchants may also provide the JIT service and/or the user with incentives useable to promote selection of that merchant. Thus, in one embodiment, a coupon, rebate, or the like, might be provided to the JIT service and/or user for purchases made from that merchant.

Illustrative Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices 101-108, merchant sites 120-123, and JIT services 130, each of which communicates through wide are network/local area network (network) 150.

One embodiment of a client device is described in more detail below in conjunction with FIG. 2. Briefly, however, client devices 102-108 may include virtually any mobile computing device capable of receiving and sending a message over a network, such as network 150, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, location detection devices, integrated devices combining one or more of the preceding devices, or the like.

Client device 101 may include virtually any computing device that typically connects using a wired communications medium such as personal computers, multiprocessor systems, microprocessor-based or programmable consumer electronics, network PCs, or the like. In one embodiment, client devices 101-108 may be configured to operate over a wired and/or a wireless network.

Client devices 101-108 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages such as email, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message. In one embodiment, the client application may operate as a standalone application.

The client application may further provide information that identifies itself, including a type, capability, name, or the like. In one embodiment, client devices 101-108 may uniquely identify themselves through any of a variety of mechanisms, including a phone number, Mobile Identification Number (MIN), an electronic serial number (ESN), Internet Protocol (IP) address, network address, or other device identifier. Moreover, client devices 102-108 may further provide information useable to determine a location of the client device. Such information may include position information such as through a Global Positioning System (GPS), or any of a variety of other location detection mechanisms. In one embodiment, a user may indicate during registration with the JIT services 130, that the user's location may be tracked based on information from their client device, their vehicle, or some other location device, such as a portable third device.

Client devices 101-108 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-108 may include a client application that enables the user to log into a user account that may be managed by another computing device. Such user account, for example, may be configured to enable the user to receive emails, send/receive IM messages, SMS messages, access selected web pages, register for a JIT service, identify recurring orders, place JIT orders, modify JIT orders, obtain updates to an order, or the like. However, managing of messages, and/or JIT orders may also be performed without logging into the user account.

Network 150 is configured to couple client devices 101-108 with SIT services 130, and merchant sites 120-123. Network 150 may include any of a variety of wireless sub-networks that may further overlay stand-alone ad-hoc networks, or the like, to provide an infrastructure-oriented connection. Such sub-networks may include mesh networks, Wireless LAN (WLAN) networks, cellular networks, or the like.

Network 150 may further include an autonomous system of terminals, gateways, routers, or the like connected by wireless radio links, or the like. These connectors may be configured to move freely and randomly and organize themselves arbitrarily, such that the topology of network 150 may change rapidly.

Network 150 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-108 with various degrees of mobility. For example, network 150 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, WiFi, or the like.

Network 150 is also enabled to employ any form of computer readable media for communicating information from one electronic device to another. Thus, network 150 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 150 includes any communication method by which information may travel between computing devices.

Merchant sites 120-123 represent virtually any location configuration useable to provide goods and/or services to a user. Thus, merchant sites 120-123 include, but are not limited to traditional stores, or other establishments. Non-exhaustive examples, of such merchant sites included garages, restaurants, coffee shops, movie theatres or other entertainment venues, hotel, motels, travel services, valet services, drug stores, grocery stores, banks or other financial institutions, or the like. Merchant sites 120-123 may also include locations configured to provide delivered goods/services to a user's location, such as a pizza delivery site, house cleaning service, or the like.

Such merchant sites 120-123 may employ any of a variety of devices to manage requests for their goods/services, including cash registers, personal computers, desktop computers, multiprocessor systems, microprocessor-based or programmable consumer electronics, network PCs, servers, network appliances, and the like. In one embodiment, the devices may be configured with a touch screen, or other entry mechanism for the merchant. Moreover, the devices may be configured to enable the merchant to perform a variety of actions, including, but not limited to viewing upcoming orders based on a time criteria, viewing past orders, viewing modifications/cancellations of an order, or issue a refund. The device may further enable the merchant to reorganize a way in which orders are displayed based on any of a variety of algorithms (e.g., grouping frozen drink orders for the next ten minutes together, or the like), modifying a status of an order (e.g., not taken care of, being prepared, ready, picked up, paid for, or the like), manually reorganize an order queue, such as by dragging an order, or the like. The device is not limited to enabling these actions, and others may also be included, such as providing an ability to update a stock status of various items, setting and/or modifying a busyness level, or the like. Such busyness level may be provided automatically such as based on information obtainable from various sensors with a merchant's site, or provided manually by a merchant. The level of busyness may be indicated using a variety of approaches, including, but not limited to a simplified rating of busyness, such as high, medium, or low; or through estimates of time, pending orders, customers within the merchant site, length of a current wait queue, or the like.

The merchant's device may further allow the merchant to create a schedule of projected busyness, such as might arise based on known events to occur in the future, or to have such determination be performed automatically, based on information provided to the device from other sources, such as neighboring merchants, or the like. The device may further allow the merchant to set and/or modify wait times associated with a busyness level.

The merchant's device may also enable the merchant to deploy promotional or brand incentives, awards, coupons, or the like, such as temporary coupons, or the like, that may be used to encourage user traffic to a particular merchant location, or the like. In one embodiment, the merchant might employ such incentives to direct user traffic towards locations of the merchant where the volume of clients is determined to be low. However, the invention is not limited to these criteria, and others may also be used.

The merchant's device may further enable the merchant to receive pickup confirmations, either through the JIT services 130, and/or a user's client device, such as client devices 101-108, or the like. Moreover, the merchant's device may also detect a customer that has a pending order by, for example, recognizing the user's mobile device's identifier, indicating that the user is within a distance from the merchant's site, or the like.

Where merchant sites 120-123 are related, one or more of the merchant sites might employ a centralized networked system that is configured to enable at least some of the actions and capabilities described above. Thus, in one embodiment, at least one of merchant sites 120-123 might include a network device configured with a data store that may manage inventories, orders, or the like, for one or more other merchant sites. However, the invention is not so constrained, and in another embodiment, each of merchant sites 120-123 might include a network device that manages the above actions and data, independent from other merchant sites.

In one embodiment, merchant sites 120-123 may uniquely identify themselves through any of a variety of mechanisms, including an Internet Protocol (IP) address, network address, or other device identifier, domain name, or the like. Such information may include or enable additional information to be obtained about the merchant site, including but not limited to what goods/services may be available through the merchant site, a location of the merchant site, any hour constraints, parking constraints, or the like, that might affect a user's selection of the merchant site for order placement.

One embodiment of JIT services 130 is described in more detail below in conjunction with FIG. 3. Briefly, however, JIT services 130 includes virtually any network device that may be configured and arranged to manage JIT order placement for goods/services for a mobile user, by, in part, seeking to minimize the user's wait time to pickup or otherwise obtain the order. Such devices include, but are not limited to personal computers, desktop computers, multiprocessor systems, microprocessor-based or programmable consumer electronics, network PCs, servers, network appliances, and the like.

JIT services 130 may be configured to provide a user interface over network 150 for use by one or more of client devices 101-108. Such user interface may be accessible, in one embodiment, such as using a web browser. However, the invention is not so limited. For example, in one embodiment, JIT services 130 might be configured to provide a downloadable application, script, applet, or the like, to client devices 101-108 that is useable to manage JIT orders.

JIT services 130 may provide within the user interface an ability for a user to register for JIT services, and to place or otherwise manage JIT orders, including recurring orders. JIT services 130 may further provide within the interface status displays useable to monitor a status of an order.

JIT services 130 may also provide a merchant interface that merchant sites 120-123 may employ to provide information about the merchant site, inventory information, order information, locktime information, and the like.

It should be noted, that while JIT services 130 is illustrated as a distinct network device; the invention is not so limited. For example, JIT services 130 may be integrated within one or more merchant sites 120-123, distributed across a plurality of network devices, or any of a variety of other configurations, without departing from the scope of the invention.

Illustrative Client Environment

Figure 2:
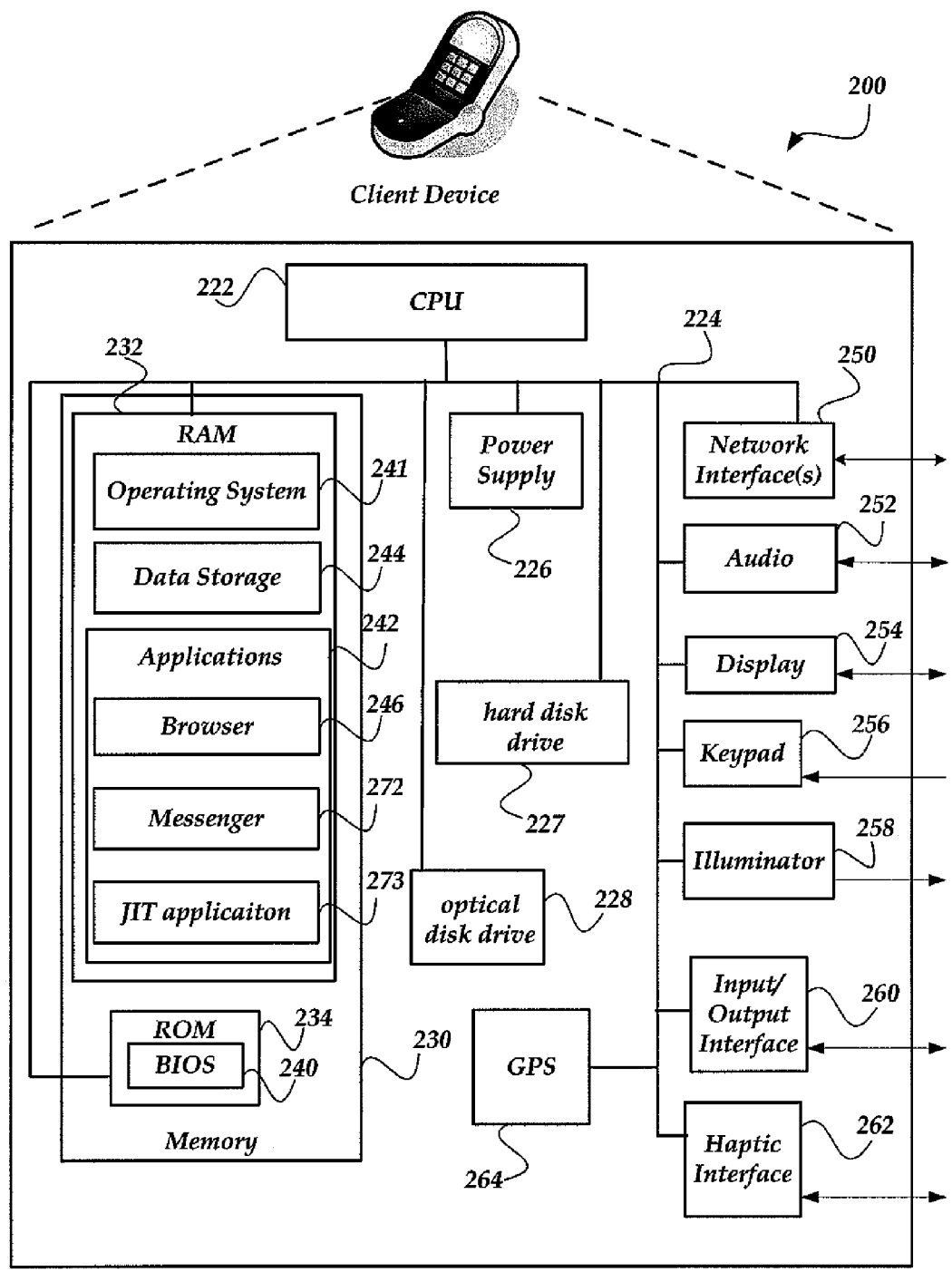
FIG. 2 shows one embodiment of a client device that may be employed within the environment illustrated in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 102-108 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted OPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

In one embodiment, GPS transceiver 264 may operate with one or more other components of client device 200 to connect to a network, such as network 150 of FIG. 1, to provide location information to another computing device.

It should be noted, that where the user's configuration includes a GPS or other location detection device that is separate from client device 200, then that device may also include, in one embodiment, an ability to connect to a network to provide location information to another computing device.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. In one embodiment, data storage 244 may be configured to store information useable by the user to manage JIT orders, including, but not limited to user account information, recurring order information, merchant information, or the like. At least a portion of the information may also be stored on a disk drive or other storage medium within client device 200, such as hard disk drive 227, optical disk drive 228, or the like. In one embodiment, a portion of the information may also be located remote to client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include browser 246, messenger 272, and JIT application 273.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as Hyper-Text Markup Language (HTML), a wireless application protocol (WAP), a Handheld Device Markup Language (HDML), such as Wireless Markup Language (WML), WMLScript, JavaScript, and the like.

Messenger 272 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 272 may be configured as an IM application, such as AOL Instant Messenger, Yahoo! Messenger, .NET Messenger Server, ICQ, or the like. In one embodiment messenger 272 may be configured to include a mail user agent (MUA) such as Elm, Pine, MH, Outlook, Eudora, Mac Mail, Mozilla Thunderbird, or the like. In another embodiment, messenger 272 may be a client application that is configured to integrate and employ a variety of messaging protocols. In one embodiment, messenger 272 may employ various message boxes to manage and/or store messages.

In one embodiment, applications 242 may also include JIT application 273, which may be configured as at least one of a downloaded application, script, applet, or other component, that is configured to enable the user to manage JIT orders. As such, JIT application 273, and/or through browser 246 and/or messenger 272, the user may manage their JIT orders. Using one or more of these components, the user may be able to provide messages to and received messages from a merchant site and/or JIT services. Thus, the user is enabled through client device 200 to access and register for JIT services, generate, and/or configure a user account, including providing user preferences, setup recurring orders, place orders, and the like.

In one embodiment, the components within client device 200 may also be configured to provide at least some actions that might be performed in another embodiment by JIT services. Thus, in one embodiment, JIT application 273 might access location information from the location detection component, and evaluate a likelihood of the user picking up the order on time, based on the user location, traffic conditions, time, and place of the pickup, store busyness information, and the like. JIT application 273 may prompt the user to modify a time or place of an order when it is determined that the user will not be able to be on time. JIT application 273 also prompt the user to modify the place or items of order when it is determined that the place of pickup is out of stock of one or more of the items being picked up. JIT application 273 may further provide an ability for the user to create an order. JIT application 273 may then find a store for pickup of the order based on location, travel preferences, or the like, where such travel preferences may include, but are not limited to close to current position, close to a destination, smallest detour from route, quickest to receive order, or the like. JIT application 273 may also perform an analysis of past orders to prompt the user with possible orders. For example, in one embodiment, JIT application 273 might determine that a user likes to buy a sandwich every Thursday at 5 PM. JIT application 273 might then prompt the user to make such order, or even automatically place the order for the user, and provide status of when and where the order may be picked up.

JIT application 273 may also check for updated versions and prompt the user to install them, or automatically retrieve and install the updates.

As noted above, in one embodiment, one or more components residing within client device 200 may perform at least some of the above actions. However, in another embodiment, a remote device, such as JIT services 130 of FIG. 1, might perform such actions, and provide a user interface to the enable interactions with the user through the downloaded component, browser, and/or messenger. In still another embodiment, some of the above actions may be performed by the components on client device 200, while other actions are performed by the remote device. Thus, the invention envisages a variety of architectural implementations, and is therefore not limited merely by any one implementation.

Illustrative JIT Services Device

Figure 3:
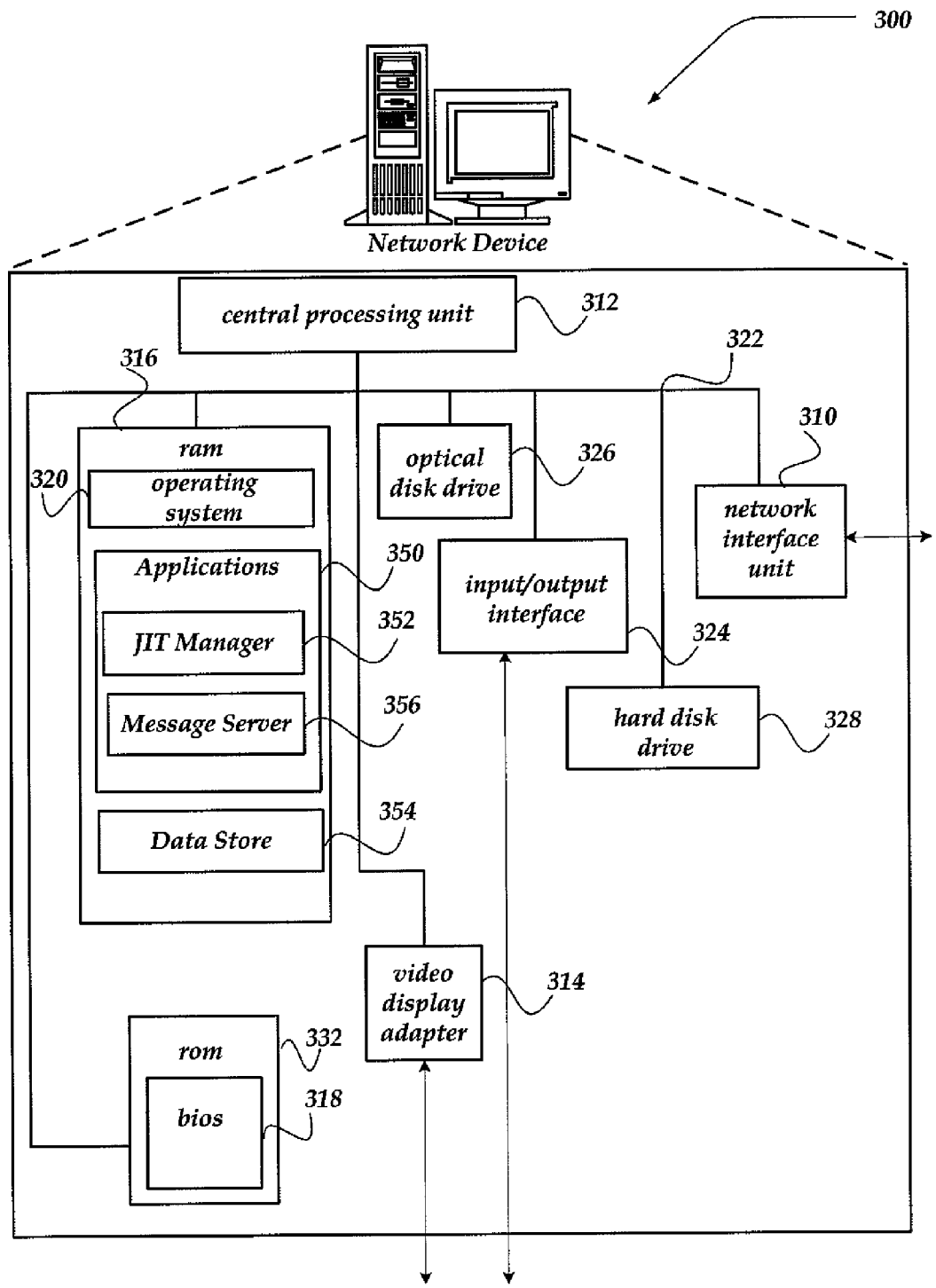
FIG. 3 shows one embodiment of a network device that may be employed to manage just in time pickup and/or delivery of goods or services.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may, for example, represent JIT Services 130 of FIG. 1.

Network device 300 includes processing unit 312, video display adapter 314, and a mass memory, all in communication with each other via bus 322. The memory generally includes RAM 316, and ROM 332. Network device 300 also includes one or more mass storage devices, such as hard disk drive 328, tape drive, flash drive, optical disk drive, and/or floppy disk drive. The memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, network interface card (NIC), or the like.

Network device 300 may also include an SMTP handler application for transmitting and receiving email. Network device 300 may also include an HTTP handler application for receiving and handing HTTP requests, and an HTTPS handler application for handling secure connections. The HTTPS handler application may initiate communication with an external application in a secure fashion.

Network device 300 also may include input/output interface 324 for communicating with external devices, such as a mouse, keyboard, scanner, or other input devices not shown in FIG. 3. Likewise, network device 300 may further include additional mass storage facilities such as optical disk drive 326 and hard disk drive 328. Hard disk drive 328 is utilized by network device 300 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 350 are loaded into memory and run on operating system 320. Examples of application programs include schedulers, calendars, transcoders, database programs, word processing programs, spreadsheet programs, security programs, web servers, and so forth. Mass storage may further include applications such message server 356, JIT manager 352, and data store 354.

Data store 354 is configured and arranged to store and otherwise manage information useable for just in time order management of goods and/or services. In one embodiment, data store 354 may include a variety of information useable by one or more merchant sites. For example, such information may be useable by a chain of related merchant sites. The information that may be managed for the one or more merchant sites includes, but is not limited to such information as name and location of each merchant site. The location information may take virtually any form, including providing a geographical location, an address, zip number, city, state, hours of operations, special closing times, or the like. The information may also include stock status information for a variety of type of items and/or ingredients for each merchant site. The information may further include menu item information that, in one embodiment, may be organized by type, prices, or a variety of other structures, information about condiments, prices of such condiments, how they may be employed within a menu, or the like. In the case of setting up an appointment, details for the appointment may also be stored, including information about the objective of the appointment, requested length of appointment with service, such as expected time required with a bank teller, or customer's ideal time for their oil change to be completed. Data store 354 may also include an estimate of time for preparing of an item. Data store 354 may also include special event information, recurring busyness times, or the like, that might affect a merchant site's ability to respond to an order quickly. Thus, for example, if a merchant site knows that every Saturday afternoon, or on a given day, that a sports game occurs, or that a business down the street provides a large number of customers, then such information may also be stored in data store 354.

Data store 354 may also include information about a user of the JIT services, including, but not limited to a user name, login, password, email and/or other communication mechanisms, store card(s), account number(s), and the like. Data store 354 may further include user information about the user's preferences, such as favorite merchant/locations, any custom orders such as custom drinks, customized food preparations, or the like. Data store 354 may further include information about a user's ordering behaviors, recurring order information, whether the user tends to perform selected actions that may indicate a pattern, such as always being early/late to pick up an order, always driving a particular route, always ordering a particular item on a particular day of a week, or the like. Data store 354 may also include a variety of other information about a user, including alert information, or the like.

Data store 354 may also include, for example, information about each order by a user. Such per order information may include, but is not limited to, item(s) being ordered which can be items from a menu or other list, and/or items built by the user, special orders, reservations, or the like. Per order information may further include merchant location information where the user may pick up the order, a data/time when the order will be picked up, account information indicating how the item is to be paid for, whether the order is a recurring order and information about the recurring order such as which days it is repeated on, a time it repeats, when the order expires, or the like. Per order information may also include information about any special events or special days or on which recurring orders might not be repeated (such as, for example, not repeating a recurring order on a holiday, or the like.).

It should be noted, that while data store 3 54 is illustrated as a single data store, the invention is not so limited. Thus, in one embodiment, data store 354 may comprise a plurality of data stores, some of which may be stored remote from network device 300. Moreover, in at least one embodiment, portions of the data described above may be stored by a merchant's data store, rather than by a JIT service's data store. Thus, it should be clear that the invention is not limited to a single implementation architecture for where and/or how such information is stored, and a variety of implementation schemes are envisaged based on contracts, policies, security, procedures, quality of service, system failure considerations, convenience, or the like. In any event, data store 354 may be implemented using a variety of technologies, including, but not limited to, folders, spreadsheets, data bases, scripts, applications, or the like. Data store 354 may also be implemented within any of a variety of storage mediums, without departing from the scope of the invention.

Message server 356 may include virtually any computing component or components configured and arranged to manage messages from/to message a client device, and/or other message servers. Message server 356 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like. However, message server 356 is not constrained to email messages, and other messaging protocols may also be managed by one or more components of message server 356. For example, message server 356 may also be configured to manage SMS messages, IM, MMS, IRC, mIRC, or any of a variety of other message types. Moreover, message server 356 may further manage messages that may include one or more image files, links to image files, or the like. Message server 356 may be employed to enable JIT manager 352 to send/receive orders, provide updates on orders, or the like, to merchant sites, users' client devices, or the like.

JIT manager 352 is configured and arranged to manage just in time pickup and/or delivery goods and/or services by a mobile customer. Thus, JIT manager 352 allows users to make an order and payment of an ordered good and/or service, schedule appointments for services, reservations, or the like, through a mobile device. However, the invention is not limited to mobile devices, and non-mobile devices may also be employed, at least in part, to enable a user to manage an order. Users may, however, employ their mobile device to order virtually any good/service from virtually any participating merchant site, and modify their orders up to a defined locktime, including cancelling the order. Such locktime, however, is arranged as a time after which the user, merchant site, or even JIT manager 356 may be inhibited from modifying an order. JIT manager 352 may also be configured to enable a user to receive intelligent notifications, prompts, or the like, related to a status of their orders.

JIT manager 356 may be configured and arranged to provide a user interface that enables a user to manage their orders. The user interface may be implemented through web pages, for example; however, any of a variety of other mechanisms may also be employed. Moreover, the user interface may, in one embodiment, recognize characteristics of a communicating client device, and automatically modify a format, content, or the like, based in part on limitations of the client device, such as screen size, operating system, executing applications on the client device, or the like. Moreover, in one embodiment, JIT manager 356 might select different protocol mechanisms based on network constraints, or the like. Thus, if the client device can not communicate over a web interface, or the throughput is below some defined value, JIT manager 356 might attempt communications using SMS, IM, or another protocol.

The user interface may enable the user to create an account, in part, by providing a unique login, password, email address and/or other messaging address, or the like. In one embodiment, confirmation of the provided user information might be requested. The user interface may also enable the user to create an account by providing a store card number (or other credit card information), PIN information, and/or guest account information, or the like.

JIT manager 356 may also enable the user to attach/detach store card (or other credit card information) to the account in a secure manner, check balances of the user's store cards, add credit to a store card, or perform other credit activities.

The user may also be allowed to provide custom order information, personal preference information, recurring information, enable JIT manager to track location of the user's mobile device by providing information about the mobile device, or other location detection device, or the like. The user might also be enabled to modify orders, monitor a status of an order, select where/when to pick up the order, or perform virtually any of a variety of other order related activities.

The user may also be able to setup alert and/or other messaging information, that may, in one embodiment, be used to notify the user when an order is being prepared, is completed, is delayed, can't be satisfied, or the like. In one embodiment, such alerts, notifications, or the like, may employ email, IM, or virtually any other messaging protocol. Moreover, such alerts and/or notifications may be configured on a per order, a per order type, or any of a variety of other configurations. The user may also be able to employ the user interface to provide special information, such as vacation events, or the like, when a recurring order is not to occur, or the like. It should be noted that such information that the user may provide to JIT manager 356, such as described above, are merely non-exhaustive examples of information, and the user may provide more or less than the information suggested above, without departing from the scope of the invention.

JIT manager 356 may further provide an interface useable by administrators, or the like, to manage information within data store 354. Thus, JIT manager 356 might enable one to add goods and/or services, modify a list of available goods/services including, but not limited to names, prices, compatible condiments or other goods/services, preparation time, locktimes, or the like. JIT manager 356 may also allow for customization of an interface's appearance, by selecting, for example, templates for a layout and/or a set of graphics, logos, skins, decorations, or the like that a user, merchant site, or the like, might employ when interacting with JIT manager 356. JIT manager 356 may also allow the administrator, or the like, to view orders, arrange them by a particular merchant site, user, item, cost, time/date, expected fulfillment time, or the like. The interface may also allow for modifying of merchant information within data store 354. Thus, in one embodiment, the interface may be useable by a given merchant, a centralized merchant authority, or even by each merchant site.

As noted elsewhere, JIT manager 352 may perform operations to also provide a downloadable component to a client device that may be used to interact with JIT manager to allow a user to manage their orders, user information, or the like. In one embodiment, JIT manager 352 may perform tracking of a user's location and dynamically select merchant sites based on a variety of parameters directed towards minimizing a user's wait time to pickup an order, or optimizing pickup time to match customer's route or schedule. JIT manager 352 may also manage modifications of orders where, in one embodiment, a request to modify the order is not within a locktime for the good/service being requested. JIT manager 352 may also enable a user to track a status of an order, or the like. As noted above, JIT manager 352 may perform many of these actions, enable the downloadable component to perform many of these actions, or operate in conjunction with the downloadable component to perform many of these actions. Thus, in at least one embodiment, JIT manager and/or the downloadable JIT application 273 of FIG. 2 may perform at least some of their actions using processes such as described below in conjunction with FIGS. 5-6.

Illustrative Merchant Site Device

Figure 4:
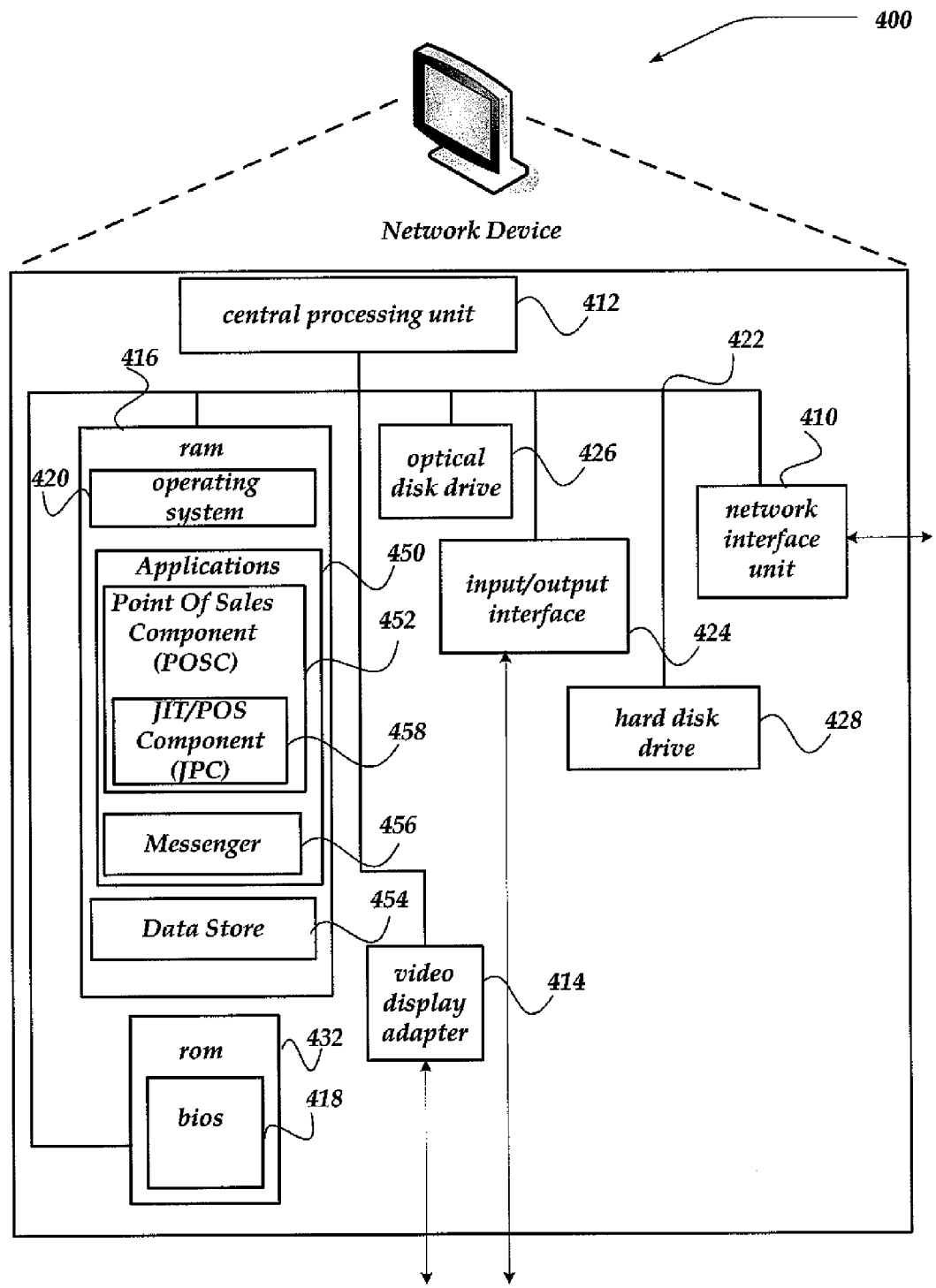
FIG. 4 shows one embodiment of a network device useable by a merchant for managing just in time order and deliveries.

FIG. 4 shows one embodiment of a network device, according to one embodiment of the invention. Network device 400 may include many more or less components than those shown. The components shown, however, are sufficient to disclose an illustrative embodiment for practicing the invention. Network device 400 may, for example, represent merchant sites 120-123 of FIG. 1. As such, it should be clear that a given merchant site may employ a more simplified network device that described below. For example, in one embodiment, a merchant site might simply employ a cash registrar, with a simplified PDA type device, using dial-up connections, touch screen, or even a configuration with pre-defined push buttons, or the like. Thus, network device 400 is not to be construed as limiting the invention in any way, but is merely provided as one of a variety of possible configurations usable by a merchant site to enable management of just in time orders. Moreover, although not illustrated, a merchant site might employ a variety of sensors, or other mechanisms to enable the merchant to determine a level of busyness. For example, the merchant might have sensors, cameras, or the like, that determine a number of customers in a wait queue, or the like.

In any event, as shown, network device 400 includes processing unit 412, video display adapter 414, and a mass memory, all in communication with each other via bus 422. The memory generally includes RAM 416, and ROM 432. Network device 400 also includes one or more mass storage devices, such as hard disk drive 428, tape drive, optical disk drive, and/or floppy disk drive. The memory stores operating system 420 for controlling the operation of network device 400. Any general-purpose operating system may be employed. Basic input/output system ("BIOS") 418 is also provided for controlling the low-level operation of network device 400. As illustrated in FIG. 4, network device 400 also can communicate with the Internet, or some other communications network, via network interface unit 410, which is constructed for use with various communication protocols including the TCP/IP protocol. Network interface unit 410 is sometimes known as a transceiver, transceiving device, network interface card (NIC), or the like.

Network device 400 may also include an SMTP handler application for transmitting and receiving email. Network device 400 may also include an HTTP handler application for receiving and handing HTTP requests, and an HTTPS handler application for handling secure connections. The HTTPS handler application may initiate communication with an external application in a secure fashion.

Network device 400 also may include input/output interface 424 for communicating with external devices, such as a mouse, keyboard, scanner, or other input devices not shown in FIG. 4. Likewise, network device 400 may further include additional mass storage facilities such as optical disk drive 426 and hard disk drive 428. Hard disk drive 428 is utilized by network device 400 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 450 are loaded into memory and run on operating system 420. Examples of application programs include schedulers, calendars, transcoders, database programs, word processing programs, spreadsheet programs, security programs, web servers, and so forth. Mass storage may further include applications such message server 456, data store 454, and Point of Sales Component (POSC) 452. In one embodiment, POSC 452 may include a JIT/POS component (JPC) 458. However, in another embodiment, JPC 458 may be distinct from POSC 452.

Data store 454 is configured and arranged to store and otherwise manage information useable for just in time order management of goods and/or services. As described above in conjunction with FIG. 3, data store 454 may be configured to manage merchant site specific data information, and/or information for a chain of related merchant sites.

Message server 456 may include virtually any computing component or components configured and arranged to manage messages from/to message a client device, and/or other message servers. Message server 456 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. However, message server 456 is not constrained to email messages, and other messaging protocols may also be managed by one or more components of message server 456. For example, message server 456 may also be configured to manage SMS messages, IM, MMS, IRC, mIRC, or any of a variety of other message types. Message server 456 may enable communications with JIT services 130, and/or client devices 101-108 of FIG. 1, for example.

POSC 452 may represent virtually any form of merchant management application, including traditional point of sales applications, or the like. Thus, POSC 452 might include a touch screen interface that enables a merchant to place orders by a user into the system, view status of an order or the like. In one embodiment, at least some information may be communicated between JPC 458 for use in managing just in time orders.

JPC 458 may be configured and arranged to receive JIT orders, confirm JIT orders, provide busyness level information, or any of a variety of merchant location specific information useable to manage JIT orders as described elsewhere. In one embodiment, JPC 458 might receive sensor information about customer wait times, or the like, that may be provided to another device for use in determining wait times for a given merchant site.

Generalized Operation

Figure 5:
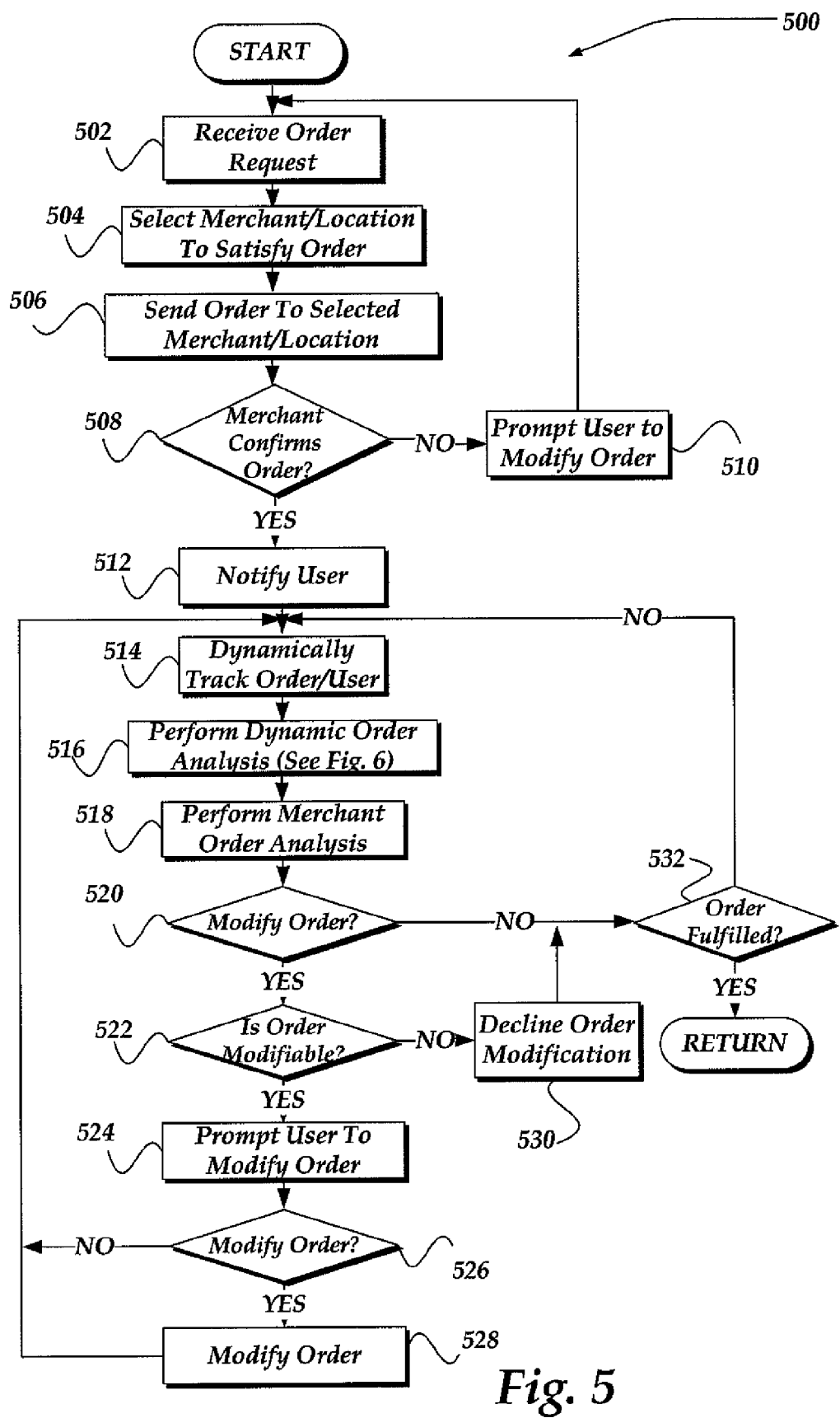
FIG. 5 illustrates a logical flow diagram generally showing one embodiment of an overview process of just in time service management useable for directing mobile customers.

The operation of certain aspects of the present invention will now be described with respect to FIGS. 5-7. FIG. 5 illustrates a logical flow diagram generally showing one embodiment of an overview process of just in time service management useable for directing mobile customers. As noted above, process 500 of FIG. 5 may be implemented within one or more components of FIG. 1, including, but not limited to JIT services 130, client devices 101-108, and/or merchant sites 120-123.

Process 500 begins, after a start block, at block 502, where an order request is received. It should be acknowledged that in at least one embodiment, the user providing the order request may have already registered with the JIT services, providing various information, including at least the information described above. During block 502, if the user submitting the order is a repeat customer, analysis of tracked behaviors may also be performed at block 502, the results of which might include providing to the user suggestions on recurring orders, modifications to the submitted order based on the tracked behaviors, or the like. For example, the user might have submitted at block 502 a request for coffee, but, the system notices that each time the user ordered coffee during this time of day/week; the user also purchased a pastry. For instance, in one embodiment, if a pattern of a user is detected of ordering coffee every Thursday morning at 8:00 AM, then a prompt to setup a recurring order could also be provided to the user suggesting a recurring order be established for every Thursday morning, same time, and same order. Moreover, based on merchant coupons, incentives, or the like, the system might also provide additional suggestions to the user to modify their initial order.

It should be noted, that while the above example, is illustrated within the context of ordering coffee, the invention is clearly not restricted to such goods, and other goods/services are also considered, as stated above. Thus, for example, the user might have requested a service at a garage for a tune-up, and the process notes that the when the user performs a tune-up, they frequently request that the vehicle be washed. Thus, the system might suggest that the user include a vehicle wash as well. Moreover, the system might even provide a car wash coupon, if available. While these examples describe readily detectable patterns, the examples are not intended to limit the invention's scope and/or capabilities to recognize, for example, more complex and/or less obvious patterns.

In one embodiment, the user may also provide at block 502, during registration, or at some other time, information indicating what parameter the user may want to have minimized and/or otherwise optimized. Thus, for example, the user might be allowed to input that the process is to seek to optimize a user's route when selecting a merchant location, a user's schedule, minimizing a user's wait time, order time, or any of a variety of other parameters. Moreover, in one embodiment, the process might provide a default parameter for which the process seeks to optimize or otherwise minimize, such as wait time, or the like.

In any event, processing then flows to block 504, where a merchant location is then dynamically selected to satisfy the order. Such merchant location selection may be based on a variety of factors directed towards enabling the user to pickup/receive the order with a least amount of wait time determinable, and/or any of a variety of other user-selectable parameters, or other system identified parameters, and/or combinations thereof. One embodiment of such a process useable for performing such merchant location determination is described in more detail below in conjunction with FIG. 7.

Processing then flows to block 506, where the order is sent to the selected merchant location. In one embodiment, the order may be sent directly to the selected merchant location. However, in another embodiment, the order might be sent to a centralized merchant server routing location, or the like. Processing then continues to decision block where the merchant reviews the order, user information such as the user's account balance, or the like, along with busyness level, item availability expectations at the time of expected pickup/delivery, and the like. If, at block 508, the merchant responds with a confirmation that the order is approved and can be satisfied, processing flows to block 512; otherwise, processing flows to block 510.

At block 510, the user is notified that the order may not be satisfied and suggests that the order is modified. In one embodiment, portions of block 504 might also be performed at this time, to provide to the user a suggested alternate merchant location that might be able to satisfy the order. In any event, processing loops back to block 502, where the user might modify and resubmit the order.

At block 512, where the merchant confirmed the order, the user is notified. In one embodiment, the user communications may be over their mobile device. It should be noted however, that the user might submit an order using a desktop computer, such as just before leaving their home, office, or the like, and receive updates, provide modifications, or the like, to the order, through their wireless mobile device.

Processing continues next to block 514, where the order, location of the user, traffic conditions, merchant inventory, merchant busyness level changes, and other parameters are dynamically tracked to determine whether the order is to be modified.

Process 500 flows next to block 516, where a dynamic order analysis is performed. One embodiment of block 516 is described in more detail below in conjunction with FIG. 6. Briefly, however, at block 516, various conditions and/or events are evaluated that might result in prompting the user to modify the order. For example, should there be a conflict in a predicted time of arrival of the user and a order fulfillment, recurring behavior patterns, proximity range detection, or the like, that may are determined, then the user might be prompted to modify the order.

Processing flows to block 518, where merchant order analysis is performed. Such analysis might include determining whether the order can be fulfilled at the selected merchant location within a desired minimal wait time. Thus, such factors as whether the merchant's busyness level has changed significantly such that the user might arrive long before the order is ready, resulting in a perceived undue wait situation. In one embodiment, this may be based, for example, on comparing times from other possible merchant locations, and determining that another merchant location has a better minimal wait time satisfaction for this order. The merchant might also have indicated that inventory no long includes at least a portion of the order, or the like. Virtually any condition, event, or the like, might trigger a suggestion to prompt the user to modify the order within block 518 based on an analysis of the merchant's conditions.

It should be noted that modifications to an order may come from the customer as well as from various conditions external to the customer. For example, the customer might select to want to cancel the order, reschedule a pickup time, change a merchant location, modify at least a portion of the order, or the like. As noted, modifications may also come from the system, traffic conditions, merchant conditions, or the like.

In any event, processing flows next to decision block 520, where a determination is made whether the order is to be modified. If not, then processing proceeds to decision block 532; otherwise, processing flows to decision block 522.

At decision block 522, a determination is made whether the time to satisfy the order (e.g., predicted arrival time) is within the locktime for the order. If so, then it is determined that the order can not be modified and processing flows to block 530; otherwise, processing flows to block 524. It should be noted that there may be situations where even when the time is within the locktime, the order may require modifications. For example, consider where the inventory of the merchant can no longer satisfy the order due to lack of at least a portion of the order's components. In such situations, the process might then flow to decision block 524, with a notification/alert to the user indicating why the order must be modified.

At block 530, the order modification is denied, notifying the source of the modification request. Processing then flows to decision block 532. At decision block 532, a determination is made whether the order is fulfilled. Order fulfillment might include, for example, where the user pickups or otherwise receives the order. In one embodiment, the pickup/delivery might be recognized by a swipe of the user's merchant card, or the like, at the merchant site, scanning an identifier accessible from the user's mobile device such as a barcode, a Bluetooth transmission, or the like, to the merchant, or even via manual entry of order fulfillment by the merchant. In one embodiment, the user may then pay for the order, or otherwise be debited, billed, or the like, for the order, provided coupons, awards, or other incentives for the order, and even receive a digital receipt/thank you or the like from the merchant for the order. In any event, if the order is fulfilled, processing returns to a calling process to perform other actions. Otherwise, processing may loop back to block 514, to continue to dynamically track the order, user, and/or other parameters relevant to the order and/or user.

At block 524, the user may be prompted with a request to modify the order, confirm an automatic modification to the order, or the like. Processing flows to decision block 526, where a determination is made whether the order is to be modified. If so, processing flows to block 528, to modify the order, and then to loop back to block 514. If the order is not to be modified, processing also loops back to block 514.

At any time after order placement, the user may receive status updates on their mobile device based on the customer's and/or merchant's preferences. The status updates can be sent to the customer at a specified time-interval before order fulfillment (e.g., preparation start) and/or at order completion, or any other specific time frame. The time to fulfill an order can be determined based on using the merchant's busyness and/or locktimes for the ordered item(s).

At relevant times, orders may also be displayed on a merchant's network device. The display may, in one embodiment, organize the orders grouping them based on products, based on time-frame, min/max values, content similarities, and/or virtually any other criteria. The data combined with data of orders made local (within the merchant's location) may then enable the merchant to combine and optimize production of the orders. For example, in one embodiment, the process might determine that there is one local order for a Caramel Frappuccino and two orders for the same drink that are deliverable within about the same next 10 minute window. These orders may then be grouped to allow similar or identical drinks to be prepared together, potentially reducing wasted time, attention, and supplies.

Figure 6:
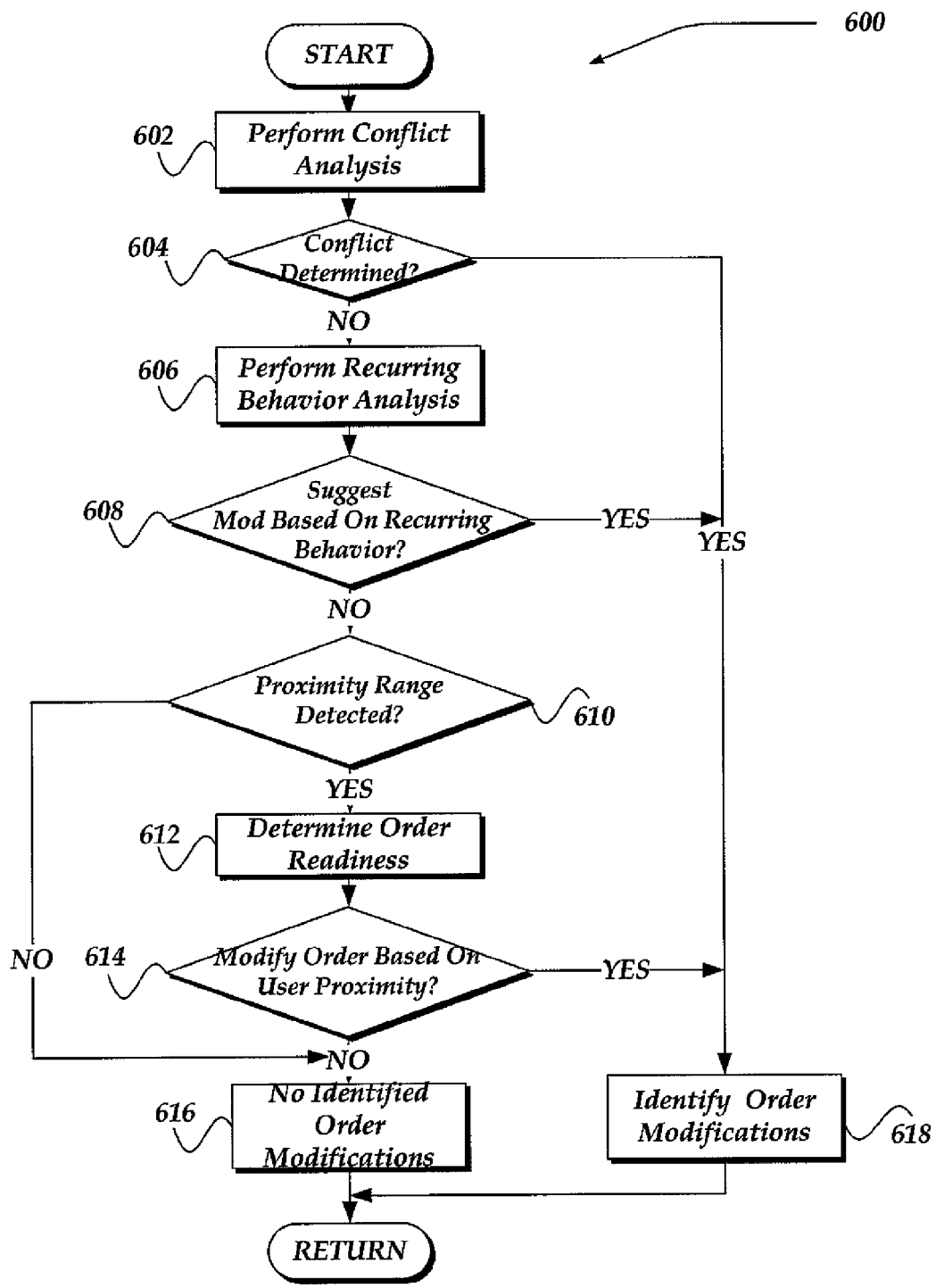
FIG. 6 illustrates a logical flow diagram generally showing one embodiment of an overview process of dynamic order analysis for potential order modifications.

FIG. 6 illustrates a logical flow diagram generally showing one embodiment of an overview process of dynamic order analysis for potential order modifications. As noted above, process 600 of FIG. 6 may represent one embodiment of block 516 of FIG. 5.

Process 600 begins, after a start block, at block 602, where a conflict analysis is performed. Such conflict analysis includes, but is not limited to evaluating whether the estimated time of arrival of the user to the merchant's location is less than a predicted time to fulfill the order. Such parameters that may impact this determination includes, such things as a merchant's data, order data, traffic data as well as traffic prediction, busyness level, inventory status, and the like.

If it is determined that a conflict exists in satisfying the order by the selected merchant, processing flows to block

618, where a notification may be sent. Processing then returns to a calling process to perform other actions.

If, however, a conflict is not determined, processing flows to block 606, where an analysis on the user's recurring behavior is performed. Such analysis may include, for example, information that indicates that the user always stops at another location before proceeding to pickup their order, tends to always to early/late to pickup their order, or any of a variety of other user patterns that might affect the user's wait time for pickup of the order. Processing flows next to decision block 608, where if such behavior is determined that might indicate an order modification is appropriate, processing flows to block 618; otherwise, processing flows to decision block 610.

At decision block 610, an analysis is performed to determine whether the user is in proximity to the merchant location where the order is placed that might indicate an order modification is appropriate to expedite the order, verify pickup of the order, or the like. Determination of such event might be made based on evaluating the user's provided location from their GPS or other location detection device, and comparing a predicted arrival time based on traffic conditions, and the like, and examining when the order is to be fulfilled. It should be noted that while the determination of the location and/or predicted time of arrival may be based on location detection devices, in another embodiment, the user might call up, or otherwise enter into a user interface, a predicted time of arrival, independent of a use of a location detection device. In any event, if it is determined that an order modification is to be suggested, processing flows to block 618; otherwise, processing flows to block 616, where no identified order modification is detected. Processing then returns to a calling process to perform other actions.

It should be noted, that while process 600 indicates possible events/conditions that might indicate an order modification is appropriate, others may also be included, and are envisaged. Therefore, the process should not be considered to be limiting the invention based on the conditions/events that might be evaluated.

As noted above, the inclusion of location detection capability in modifying an order enables integration of current destination data, and consequently projected time of arrival in selecting a merchant location. These can identify merchant locations that are en route, near current location, near target destination, or a location which may provide optimum user results, such as a location which represents a quickest order fulfillment, quickest time to ultimate destination, or the like, each of which may be specified within a user's preferences, and/or dynamically changed by the user.

One example of a potential new location includes a location with a very low busyness level. Once a location reaches a busyness threshold, determined for a given location, group of locations, or the like, a prompt might arise that suggests a different location close by, with an added discount, in one embodiment, to help disperse store traffic, incentivize the user to modify the location, or the like. This could apply to a location which is overcrowded, for example, due to a concert, movie, or other event, creating an unusual level of busyness.

It should be noted that while a location detection device is described above, the invention is not so limited. Thus, similar functionality of modifying an order, pickup location, times, and the like, may still be performed independently by collecting data from the user's input through voice, a messaging mechanism, the user interface, or the like.

Moreover, as noted above, prior history of a customer's responses may be tracked and analyzed to better aid in evaluating prompt options or whether to prompt the user in a particular situation. For example, customers who have responded positively to a certain type of prompts between 8 AM and 10 AM might continue to receive prompts. This analysis may, in one embodiment, serve a role of regulating excessive delivery of prompts, which might become an annoyance as in many automated notification systems.

As noted above, embodiments can be used to resolve potential time conflicts in order fulfillment. For example, if within a specified time frame before a pre-order, a customer makes another pre-order at a distant location, the system can detect the potential conflict in orders and send a reminder prompt to the user, request order resolution, or even automatically determine a location for the second order based on the first order. In addition, if an order is placed at a location using a customer's specific identifier (e.g., merchant card, or the like), the customer's current in-store order can also be referenced against any upcoming order, and the user can be prompted appropriately.

In a similar manner, the system can be used to detect conflicts in a user's schedule, for example, between a restaurant reservation and movie tickets. The system can then take similar parameters into account, such as distance, traffic, busyness, or the like. The system may further retrieve this information through the user input, or by interfacing with the user's calendar, or other mechanism. The system may even provide the user with options to modify one or more orders when a conflict is detected, or autodial a merchant directly, to optimize the schedule, performing a role of an assistant to negotiate changes in the order fulfillment times.

Also mentioned above, various embodiments may manage recurring orders for the user. Thus, the system allows users to create recurring orders, which may be considered to be repeated pre-orders. Moreover, the system may recognize user behavior patterns that indicate recurring order patterns, and manage them as recurring orders for the user.

For example, a user can have his coffee ready everyday at 8 AM. Each instance of a recurring order may be treated as a pre-order, and can be modified as described elsewhere. This presents a unique added advantage over traditional mechanisms for allowing orders to be known a long time in advance, allowing for better merchant management.

Recurring orders may also be created by the user, in one embodiment, through a calendar type of interface. The user may also be prompted to make an order recurring when a pattern is detected in the user's behavior. For example, if a customer orders a chai latter at 8:15 qm for some defined number of consecutive days, or on every certain day of the week, then the user might receive a prompt to create a recurring order that matches a potentially convenient pattern. The calendar feature may, in one embodiment, allow scheduling across multiple orders over multiple locations.

Randomized ordering is also envisaged as being performed by various embodiments of the invention. A random order may be based on parameters provided by the user that may limit a range of products to choose from, such as hot or cold, specific flavors, size, calories, caffeine quantity, cost of a drink, or just a random selection among products, and criteria designated by the user. It may or may not include statistical data from a particular user's order history. In the application of a sandwich, for example, certain parameters can be applied that are user-specified such as turkey and/or ham, wheat or rye-bread, various condiment inclusions/exclusions, as well as dietary information such as caloric totals, amount of fat or carbohydrates, or the like. It should be noted that these parameters can also be included in order modifications for non-random or non-recurring orders. In any event, a non-exhaustive use case for random ordering might include providing such parameters and requesting a sandwich every day for the week. The system may then employ the parameters and randomly generate an order for a sandwich each day of the week that meets the parameters. Thus, for example, if the user specifies a particular calorie total for the week, then different random orders are generated that satisfy the user's calories total for the week based on the sandwiches for the week. In this way, the user need not worry about the calorie intake for the week from the sandwiches.

However, other variations may also be employed. For example, random ordering may be combined with location routing to suggest random orders within a geographic location. Thus, in one embodiment, a customer might be able to sample a variety of coffee shops (or other types of goods/services) in an area, or on a given route, or within a vacation destination, or the like. This approach may provide a benefit to various merchants with the system which may then take advantage of knowing that a customer is more likely to visit their location, than might arise by other more traditional approaches such as dining books, coupons, or the like. A specific tour can be generated from a variety of parameters and/or preferences, essentially creating a randomized order with varying levels of freedom or restrictive criteria.

As noted elsewhere, the invention enables ordering of goods and services. Thus, in a similar way that an order can be set-up, modified, made recurring, or other features applied to goods, services, such as appointments may also be managed through the invention. Thus, it should be clear that a wide variety of goods and/or services may be managed through embodiments of the invention.

Figure 7:
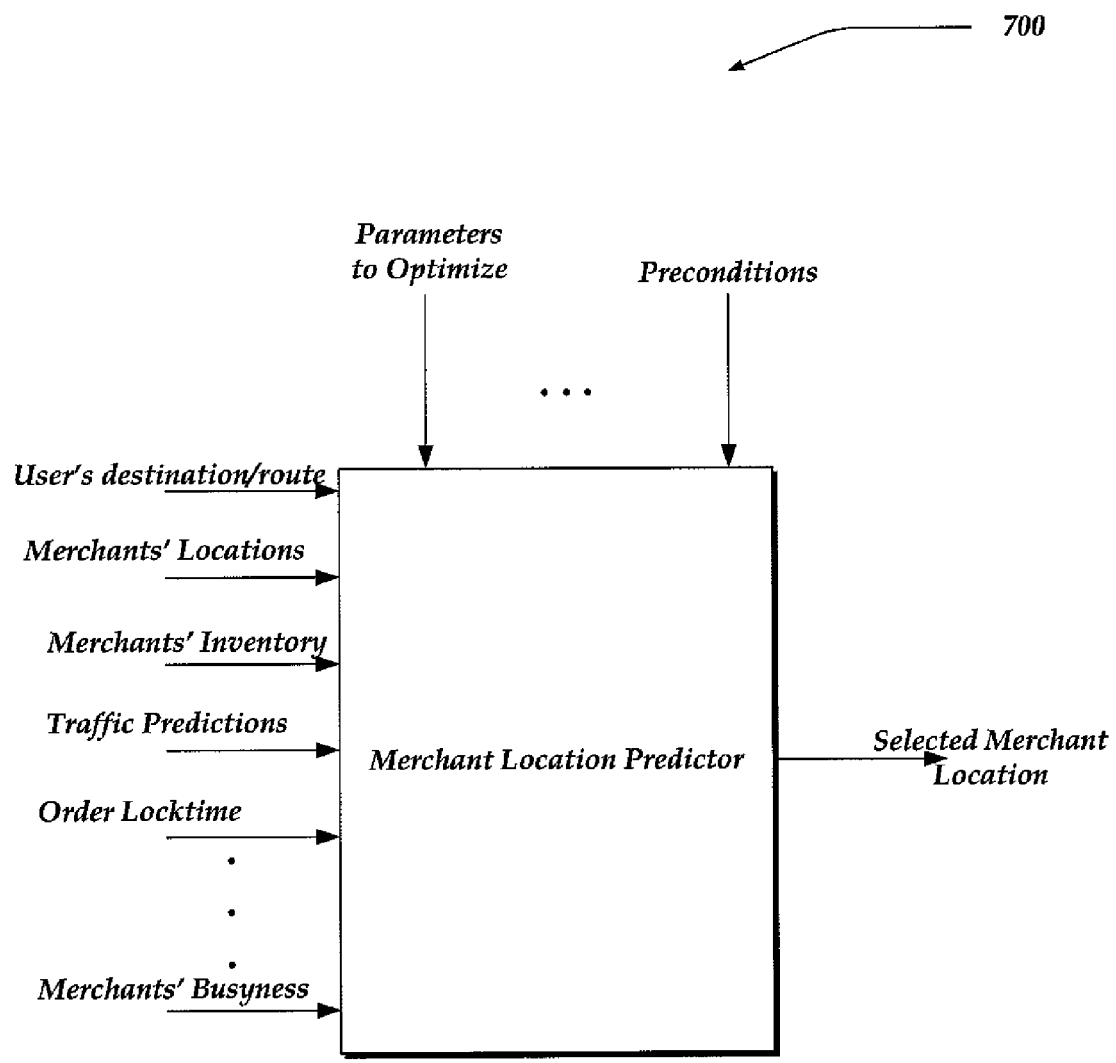
FIG. 7 illustrates one embodiment of a merchant site predicator.

FIG. 7 illustrates one embodiment of a merchant site predicator 700. Predictor 700 may be used as noted above to determine a merchant location that provides a best minimal predicated wait time to satisfy a given order. It is understood that 'minimal' is a relative term, and as such may vary based on the parameters provided, variations of the parameters over time, as well as a variety of other events, conditions, or the like. Thus, the best minimal predicted wait time is to be considered to be a relative value that may be a localized best value based on the constraints and inputs provided to predictor 700.

In any event, as illustrated in FIG. 7, various inputs are provided to predictor 700, including, but not limited to a user's destination/route, location of merchant sites, merchant inventory data, traffic prediction data, order preparation times, locktimes, location busyness levels, and the like. Parameters that may be 'optimized' include but are not limited to an arrival time, pickup time, user-selectable parameters, or the like. Pre-conditions may also be provided as input that may include preferences, randomized order constraints, traffic constraints (e.g., avoiding freeways, or the like), as well as virtually any other pre-conditions that may affect a result of predictor 700.

Predictor 700 may gather a list of all merchant locations within a defined distance along a user's route, from a current position to an expected destination. Then, for each of the locations, predictor 700 may determine a score based on at least the following parameters:
user's destination and expected destination;
location of merchant sites;
merchant site inventories;
traffic predictions';
merchant busyness';
preparation times for a given order, including locktime; and
virtually any other parameter that may be determined to be relevant.

Predictor 700 may then return a list of the merchant sites according to a determined score, where, in one embodiment, the score for each location might be based on:

$$S(a,b,c)=a*Ts+b*Tw+c*Tf,$$

where: a, b, c are real numbers provided by a calling function; Ts is an estimated travel time to the location; Tw is an estimated wait time in a given location, where in one embodiment if a user places an order right now then: Tw=max(0, store busyness+locktime−Ts); and Tf is the estimated travel time from the location to the expected destination.

Consequently, in one embodiment, S(1,1,1) may represent an estimated time from the user's location to the expected destination if the user picks up the order at that location. The best location may then be determined as that location with the lowest overall score.

Also, Tw may represent the wait time at the location, and have a different value if the user sends a pre-order, or if the user chooses to just wait in line at the location.

The above allows the system to predict an optimal or best merchant location for various preferences by modifying values for a, b, and/or c. For example:
 1. Quickest arrival time at final destination: S(1,1,1).
 2. Quickest order pickup time, with any detour acceptable: S(1,1,0).
 3. Good pickup time and good arrival time: S(2,2,1).
 4. No waiting at the location: S(0,1,0).
 5. Least time on the road: S(1,0,1).

It should be noted that the invention is not limited to these parameters, and any of a variety of other parameters may also be employed, including but not limited to selecting a location based on optimizing a user's route, schedule, order time, or the like. In one embodiment, a parameter/parameters to be minimized/optimized may be user selectable.

Since S(a,b,c) is, in one embodiment, linear, and since constants may not affect the algorithm, taking other parameters into account can be equivalent to S, as long as these parameters can be expressed as S(x,y,z)+constant.

Thus, for example, minimizing deviation time from the user's main route (path from start point to expected destination) is equivalent to S because D=deviation time=Ts+Tf−Tref, where Tref is a constant (e.g., length of the trip without the detour to the store. Thus, in one embodiment, D=S(1,0,1)+constant.

Ts and Tf may be estimated from distances using average speeds, speed limits, or be obtained from a variety of other sources, including traffic broadcasts, or the like.

While the above provides one embodiment of predictor 700, the invention is not constrained to this algorithm, and others may also be used. Thus, for example, predictor 700 may employ a non-linear algorithm, a least squares optimization mechanism, or the like, without departing from the scope of the invention. Moreover, variations in the above, and/or other algorithms may be tuned based on use, engineering judgment, or the like.

Moreover, it should be noted, that in at least one embodiment, the merchant location that may be dynamically selected using the above might be based on having a single merchant location from which to select. That is, based on a variety of criteria, including, but not limited to a user's preference, the ordered good/service/reservation or the like, or other constraints, a single merchant location is available. In such situations, the above may still be useable to optimize a variety of other parameters, such as the wait time, schedule, or the like.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Case

The following provides one embodiment of a non-exhaustive use case for JIT order management. It should be understood that this non-exhaustive use case is provided merely to illustrate one possible application of various embodiments, and is not intended to narrow the invention in any manner. Thus, other use cases might employ other embodiments of the invention not described below, without departing from the scope of the invention.

In any event, in the example, a customer might leave his office to make a one hour commute towards home. Within about 45 minutes from a local merchant, he stops at a red light, places an order for his favorite drink with the intent of matching his arrival time to the local merchant. He receives confirmation that his drink will be prepared for him and be ready for pickup when he arrives.

Along the way, he encounters heavy traffic, and realizes that he will be driving longer than expected. While being upset about the traffic, he momentarily forgets about his order. However, based on embodiments of the inventions, his traffic situation is automatically recognized. Thus, in one embodiment, the customer may be prompted by his mobile device, with at least the following options.

In a first option, based on the detected traffic delay, the customer might receive a prompt asking if he would like his order delayed by X minutes, where X is a time that is predicted based, in part, on the detected traffic situation. The customer may be prompted to interact with the mobile device to improve the timing of his order, to have his order ready at the moment he arrives to the merchant location. Embodiments of the invention may check his location, traffic data, order time, store busyness, and the like, to prompt for a better suggested order time. In another embodiment, the invention might also automatically modify the time for pickup for the customer, and notify the customer, to alleviate any additional concerns for the customer. As in virtually any order that is outside of the locktime, the customer may select to cancel the order, or otherwise modify it.

In another option, the customer might be prompted with a suggestion of another merchant location to obtain his order. A different merchant location might be located, for example, at a next exit at which a drink can be readied for him at the original order's time. After the break away from the freeway to receive his drink sooner, based on the traffic pattern prediction, the customer might select to optimize his route by changing his route, allowing traffic to subside, and affording him a smoother trip home. If the customer selects this option, embodiments may automatically, and/or upon his approval, re-route the order to a merchant closer to his current location. Upon arrival, instead of waiting in line to order, and then waiting again for his drink to be prepared, the customer may simply walk into the merchant location, swipe his merchant card, or the like, and leave with his freshly prepared drink in hand.

As noted above, other scenarios are also possible. For example, in one scenario, an item comprising the customer's order might not be available at the merchant, while the customer is driving. In this example, the customer might be prompted with any of a variety of prompts, including, without limitation, a prompt to choose an alternate drink (having been notified of the problem), a prompt to change the order pickup location to a dynamically determined alternate merchant location that might be determined based on various parameters such as described above; and/or even cancel his order.

As may be recognized from the disclosure above, various embodiments of the invention provide many unique features over the traditional order approaches. Such unique features include at least the following: a) order modifications are possible at any time before locktime; b) convenient optional reminder notification of order pickup time; c) conflict in upcoming order detection and prompting for alternate solutions; d) saves and recalls favorite stores, favorite orders, and the like for intelligent prompting; e) intelligent prompting for order modifications using, among other things, GPS, traffic data, store data, and the like; fi optimal store/route detection, based on user criteria, quickest to receive order or reach destination, or the like; g) quick verification at pickup using a card, wireless, barcode, email, or the like; h) recurring and/or random orders; i) prompting and interactions with the user that may include but is not limited to voice, text, sound alerts, email, or other messaging mechanisms; and j) user behavior tracking useable to suggest order modifications.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating on one or more network devices for use in managing orders for a mobile user, comprising:
   receiving an order for at least one good or service from the mobile user;
   dynamically selecting a merchant location to fulfill the order based in part on dynamically varying merchant conditions and a predicted time to the selected merchant location by the mobile user, wherein the selected merchant location is further selected based on minimizing an estimated wait time for the mobile user to pickup the order;
   while the predicted time to the selected merchant location by the mobile user is greater than a locktime for the order, enabling the order to be modified; and
   receiving acknowledgement of order fulfillment if the order is fulfilled by the selected merchant location.

2. The method of claim 1, wherein dynamically selecting the merchant location further comprises:
   dynamically determining a predicted time to the selected merchant location by the mobile user based on at least one of a traffic condition, an expected destination of the mobile user in a route,
   evaluating dynamically varying merchant conditions that include at least one of a busyness level, or an inventory level for items associated with the order; and
   combining the dynamically varying merchant conditions with the predicted time for each of a plurality of merchant sites that might be able to fulfill the order to generate a score for each of the plurality of merchant sites; and
   selecting the merchant location based on its resulting score.

3. The method of claim 1, further comprising:
   tracking a behavior of the mobile user to identify recurring patterns usable to modify the order or another order.

4. The method of claim 1, wherein the order is based on a randomized order, a recurring order, or a single entry order, wherein the randomized order is generated based on at least one criteria identified by the mobile user.

5. The method of claim 1, wherein if at least one of a dynamically varying merchant condition changes such that the selected merchant is detected as unable to satisfy the order within a determined minimal wait time, performing at least one of dynamically selecting another merchant location from a plurality of other merchant locations or prompting the mobile user to modify the order.

6. The method of claim 1, wherein enabling the order to be modified further comprises, enabling the order to be modified based on a change in conditions of the selected merchant location, a change in a predicted time to the selected merchant location by the mobile user, or receiving a request to modify the order from the mobile user.

7. A network device for managing orders over a network, comprising:
  a transceiver to send and receive data over the network; and
  a processor that is operative to perform actions, including:
    receiving an order for at least one good or service from the mobile user;
    identifying a plurality of merchant locations to satisfy the order;
    dynamically selecting a merchant location from the plurality of merchant locations to fulfill the order with a minimal wait time for the mobile user to pickup the order based in part on dynamically varying merchant conditions;
    while a predicted time to the selected merchant location by the mobile user is greater than a locktime for the order, enabling the order to be modified; and
    receiving acknowledgement of order fulfillment if the order is fulfilled by the selected merchant location.

8. The network device of claim 7, wherein enabling the order to be modified further comprises enabling at least one of the following to be modified: the selected merchant location, the order, an expected pickup time for the order.

9. The network device of claim 7, wherein enabling the order to be modified further comprises:
  performing a dynamic determination of an inventory of the selected merchant location;
  performing a dynamic determination of a busyness level of the selected merchant location;
  performing a dynamic determination of a proximity range of the mobile user to the selected merchant location; and
  based on performing the dynamic determinations, prompting the user to enable the order to be modified.

10. The network device of claim 7, wherein enabling the order to be modified further comprises modifying the order based on change in an expected pickup time for the order based, in part, on a change in a traffic condition.

11. The network device of claim 7, wherein the order is based in part on at least one of a recurring order or a randomized order.

12. The network device of claim 7, wherein dynamically selecting a merchant location further comprises employing a location of the mobile user or a predicted route of the mobile user to a location other than the selected merchant location.

13. The network device of claim 7, wherein enabling the order to be modified further comprises enabling the order to be modified based on a tracked behavior of the mobile user.

14. A system for use in managing pickup or delivery of a good or service, comprising:
  a plurality of merchant locations; and
  a network device that is configured to manage an order for the good or server by performing actions, including:
    receiving an order for at least one good or service from a user;
    dynamically selecting a merchant location from the plurality of merchant locations to fulfill the order to optimize at least one parameter for the user to pickup the order based in part on dynamically varying merchant conditions and a location of the user;
    while a predicted time to the selected merchant location by, the user is greater than a locktime for the order, enabling the order to be modified; and
    receiving acknowledgement of order fulfillment if the order is fulfilled by the selected merchant location.

15. The system of claim 14, wherein the at least one parameter to optimize is selected from at least one of a user's wait time, a user's route, a user's schedule, or an order time.

16. The system of claim 14, wherein the order is based on a randomized order that further is based on randomizing at least one of a component of the order, or a location of the order using at least one user specified preference.

17. The system of claim 14, wherein enabling the order to be modified further comprises prompting the user to modify the order based on a potential time conflict.

18. A computer-readable medium configured to store data and instructions thereon, wherein the execution of the instructions on a computing device enable the computing device to perform actions for managing pickup or delivery of a good or service by a user, comprising:
  receiving an order for at least one good or service from the user;
  identifying a plurality of merchant locations from which the order might be fulfilled;
  dynamically selecting a merchant location from the plurality of merchant locations to fulfill the order by optimizing a selectable parameter for the user to pickup the order based in part on dynamically varying merchant conditions and a location of the user;
  while a predicted time to the selected merchant location by the user is greater than a locktime for the order, enabling the order to be modified; and
  receiving acknowledgement of order fulfillment if the order is fulfilled by the selected merchant location.

19. The computer-readable medium of claim 18, wherein optimizing the selectable parameter comprises optimizing at least one of a wait time, an order time, a route, or a schedule.

20. The computer-readable medium of claim 18, wherein the location of the user is determined using at least one location detection device, and wherein the predicted time to the selected merchant location is determined based in part on a traffic condition.

21. The computer-readable medium of claim 18, wherein the user is provided with at least one mechanism to enable monitoring of a status of the order.

22. The computer-readable medium of claim 18, wherein dynamically selecting the merchant location further comprises determining the merchant location based on at least one of a user criteria, a quickest arrival time at an expected destination, a quickest order pickup time, or a least travel time.

23. A method for use in managing orders for a user, comprising:
  receiving an order for at least one good or service from the user;
  dynamically selecting a merchant location to fulfill the order based in part on dynamically varying merchant conditions and a predicted time to the selected merchant location by the user, wherein the selected merchant location is further selected based on optimizing at least one user-selectable parameter associated with the order;

while the predicted time to the selected merchant location by the user is greater than a locktime for the order, enabling the order to be modified; and receiving acknowledgement of order fulfillment if the order is fulfilled by the selected merchant location.

24. The method of claim 23, wherein the at least one user-selectable parameter to optimize is selected from at least one of a user's wait time, a user's route, a user's schedule, or an order time.

25. The method of claim 23, wherein the predicted time to the selected merchant location by the user is based on at least one of the user entering into a user interface the predicted time or a location, or based on the user calling the merchant location and providing at least one of a location or the predicted time.

* * * * *

UNITED STATES PATENT AND TRADEMARK OFFICE
CERTIFICATE OF CORRECTION

| | | |
|---|---|---|
| PATENT NO. | : 7,974,873 B2 | Page 1 of 1 |
| APPLICATION NO. | : 12/043719 | |
| DATED | : July 5, 2011 | |
| INVENTOR(S) | : Joel Dennis Simmons et al. | |

It is certified that error appears in the above-identified patent and that said Letters Patent is hereby corrected as shown below:

In drawing sheet 2 of 7, figure 2, in Box 273, line 1, delete "applicaiton" and insert -- application --, therefor.

In column 2, line 19, delete "tough" and insert -- though --, therefor.

In column 4, line 45, delete "are" and insert -- area --, therefor.

In column 5, line 56, delete "SIT" and insert -- JIT --, therefor.

In column 9, line 43, delete "OPS" and insert -- GPS --, therefor.

In column 13, line 56, delete "3 54" and insert -- 354 --, therefor.

In column 26, line 15, delete "fi" and insert -- f) --, therefor.

In column 27, line 67, in Claim 14, delete "server" and insert -- service --, therefor.

In column 28, line 9, in Claim 14, delete "by,the" and insert -- by the --, therefor.

Signed and Sealed this
Tenth Day of January, 2012

David J. Kappos
*Director of the United States Patent and Trademark Office*